Patented Nov. 11, 1952

2,617,715

UNITED STATES PATENT OFFICE 2,617,715

ANALYTICAL METHOD

John F. Haller, Niagara Falls, N. Y., assignor to Mathieson Chemical Corporation, a corporation of Virginia No Drawing. Application February 5, 1948, Serial No. 6,562

1 Claim. (Cl. 23—230)

This invention concerns an analytical method and more particularly a method for the quantitative analysis of aqueous solutions comprising chlorine as chlorine dioxide or chlorite.

Chlorine dioxide and chlorites, especially alkali metal chlorites, as sodium chlorite, are of great commercial utility, particularly in bleaching and in the treatment of water supply for the control of taste and odor. Water which has been treated with chlorine dioxide may contain both unreacted chlorine dioxide and chlorite together with free chlorine, hypochlorite and hypochlorous acid, the relative amounts of the latter three depending upon the pH of the water. Additionally, chlorine may be present in the form of chloramine where ammonia or ammonium salts as well as chlorine dioxide have been applied in the treatment of the water or where amines were present in the raw water. Usually the compounds will be present in inocuous quantities of the order of less than 1 P. P. M., but it is nevertheless important to know which are present, and to what extent. Also, in the analysis of bleaching solutions it is obviously important that the nature and concentration of available chlorine compounds present in the bleaching bath, before, during, and after use be known.

Methods in current use for analyzing the relatively concentrated solutions of active chlorine compounds used in bleaching are not applicable directly to the very dilute solutions represented by treated potable water. Furthermore, these methods do not distinguish satisfactorily between the compounds. The methods conventionally employed for the analysis of active chlorine compounds in potable waters likewise do not distinguish between the compounds, although they provide a reasonably accurate figure on the total amount of available chlorine. In summary, it may be stated that none of the prior art methods is suiable for the precise quantitative analysis of chlorine dioxide-treated water and bleaching baths containing chlorine dioxide and/or chlorites.

The method of the present invention provides measurements useful in analyzing an aqueous solution for its content of chlorine in the form of elemental chlorine, hypochlorous acid, hypochlorite, chloramine, chlorine dioxide and water soluble chlorites. The measurements obtained distinguish among the total content of chlorine in the form of free chlorine, that is, in the form of elemental chlorine, hypochlorite and hypochlorous acid; the total content of chlorine present in the form of chloramine; the total content of chlorine present in the form of chlorine dioxide; and the total content of chlorine present in the form of water soluble chlorites. It enables a complete analysis in 20 minutes or less, and the results can be duplicated to within 0.007 p. p. m. of available chlorine with respect to any of the several forms. The method, which will be readily understood from the description below, involves four volumetric measurements in each of which a very dilute standard arsenite solution is employed as the titrating reagent.

A. *Free chlorine.*—A sample of the solution under test is brought to a pH of at least 11, as with 5% NaOH, and allowed to stand about five minutes. It is then brought to a pH of approximately 7 by the addition of a suitable buffer and titrated with standard arsenite solution. Under these conditions the total content of free chlorine in the form of elemental chlorine, hypochlorite and hypochlorous acid is measured without interference in the presence of chloramine, chlorine dioxide and/or chlorite. The addition of alkali causes the conversion of any chlorine dioxide to chlorite and chlorate which do not interfere when the pH is subsequently brought to the vicinity of pH 5 to 8, preferably about 7.

B. *Chlorine and chloramine.*—A second sample of the solution is made alkaline as in titration "A," allowed to stand briefly and brought to a pH of about 7 through addition of a suitable acid agent. Potassium iodide or other soluble iodide is added and the solution is titrated against the standard arsenite solution. As in the case of titration "A" any chlorine dioxide present in the original solution is converted to chlorite and chlorate which do not interfere. However, chloramine as well as free chlorine liberate iodine from a soluble iodide in a pH 7-buffered solution and the figure obtained on the titration thus represents the chlorine present as free chlorine and chloramine. The difference between titrations "A" and "B" represents the available chlorine content of the solution present as chloramine.

C. *Chlorine, chloramine and one-fifth chlorine dioxide.*—In the case of the third sample of the solution the alkaline treatment is omitted, the solution being brought to pH 7 directly by buffering. Potassium iodide is added and the solution titrated against the standard arsenite solution. This measures all of the chlorine present as free chlorine and chloramine and one-fifth of the available chlorine present as chlorine dioxide. Only one-fifth of the available chlorine due to chlorine dioxide is measured under these conditions because four-fifths of the oxidizing power of the available chlorine as chlorine dioxide is utilized by conversion of the chlorine dioxide to chlorite which as brought out above does not liberate iodine from iodides at pH 7. The difference between the figure obtained on titration "C" and the sum of figures obtained on titrations "A" and "B" is a measure of one-fifth of the chlorine dioxide present in the solution and when multiplied by five represents the total available chlorine present in the form of chlorine dioxide.

D. *Chlorine, chloramine, chlorine dioxide and chlorite.*—A fourth sample of the solution containing soluble iodide is acidified, preferably to a pH of about 2, and allowed to stand briefly. The pH of the solution is then brought to about 7 by the addition of a suitable buffer and is titrated with standard arsenite solution. Under these conditions active chlorine in the form of free chlorine, chloramine, chlorine dioxide and chlorite is measured. The difference between titration "D" and titration "B" is a measure of all of the available chlorine present as chlorine dioxide and chlorite. Subtraction of the value for chlorine dioxide calculated from titration "C" from the value for chlorine dioxide and chlorite gives the available chlorine present in the solution as chlorite.

Although the method of the invention is applicable to more concentrated solutions, it is my usual and preferred practice where the solution is known to contain in excess of 10 parts per million of available chlorine to reduce the concentration by dilution to below 10 parts per million. Solutions having a concentration of available chlorine of as little as 0.01 parts per million may be successfully analyzed.

An arsenite stock solution of approximately 0.4 normal has been found particularly useful for the purposes of the invention, but the arsenite solution may vary in normality from about 0.1 to 1.0. The stock solution may conveniently be prepared, for example, by dissolving 6.50 grams of analytical grade sodium meta-arsenite in distilled water and making the solution up to one liter. Standardization may be accomplished by titration against tenth-normal iodine solution. The solution thus prepared will be found quite stable. Diluting 6.83 ml. of the stock solution to one liter gives the working solution which should be prepared daily to insure accuracy. Such titrating solution is particularly convenient for use in titrating a 250 ml. sample. Each 10 ml. of the arsenite titrating solution is then equivalent to 1 p. p. m. of chlorine. The normality of the titrating solution may vary from about 0.0001 to about 0.002 without any disadvantageous results.

The buffer solution required by the method of the invention may be prepared from a mixture of borax and boric acid. However, when pure meta-arsenite is used as the titrating reagent, phosphate buffers are preferred because of greater solubility. In forming the boric acid-borax buffer, I customarily make up a solution of 12.4 grams of fused boric oxide in 1 liter of solution, and a second solution of 3.8 grams of borax made up to 1 liter and admix 100 ml. of the second solution with 1 liter of the first. A stock solution containing 26.4 grams per liter of potassium dihydrogen phosphate and 115.2 grams per liter of sodium hydrogen phosphate has a pH of 7 and maintains such pH on dilution when used as a buffer.

Buffer solutions other than those described may be used, but it is important to avoid the use of buffers containing materials which act as reducing agents with respect to the available chlorine compounds being measured.

Where I acidify the solution under test with mineral acid, I generally use sulfuric acid. A satisfactory solution of sulfuric acid is made by diluting chemically pure acid to approximately 3 normal.

A suitable iodide solution may be prepared by dissolving 4.8 grams of chemically pure potassium iodide in 500 ml. of solution using distilled water which has been boiled and cooled. The best available grade of potassium iodide is preferred since the purer the iodide, the more stable the solution. It is usually advantageous to add solid potassium iodide rather than a solution, particularly in titration "D," since less standing time is necessary. The use of excess iodide is advantageous.

It is convenient to utilize an amperometric device for following the course of the titrations and determining the end point. In one such procedure, which has been found suitable, an external potential is applied across a silver-silver chloride reference anode and a gold cathode. The current which flows through the cell is a function of the concentration of oxidant which is being reduced at the cathode. Alternatively, a platinum cathode may be used to eliminate the necessity for an external potential to improve sensitivity and sharpen the end point.

The following examples are submitted in further illustration of my invention:

*Example I*

A sample of tap water was analyzed for active chlorine components as follows:

0.5 ml. of 5% sodium hydroxide solution was added to a 250 ml. sample of the water. After five minutes, 10 ml. of the borate buffer, described above, was added, and the solution immediately titrated by means of a 0.000705 N sodium arsenite solution uing an amperometric cell. Free chlorine was absent in this sample.

Another 250 ml. sample of the water was treated with 0.5 ml. of 5% sodium hydroxide solution and allowed to stand for the usual interval. 10 ml. of pH 7 borate buffer was added, followed by 2 ml. of 0.006 N potassium iodide solution. Titration with the same standard arsenite solution showed an available chlorine content as free chlorine and chloramine of .134 p. p. m. Since titration "A" showed the absence of free chlorine the active chlorine content of the water as chloramine was .134 p. p. m.

Free chlorine, chloramine and ⅕ of the chlorine dioxide was measured by adding 10 ml. of borate buffer and 2 ml. of 0.006 N potassium iodide in that order to another 250 ml. sample of the water and titrating amperometrically with the standard arsenite solution. The available chlorine content of the water as determined by this procedure was 1.90. Since titration "A" and "B" showed the absence of free chlorine and .134 p. p. m. of chloramine, respectively, the available chlorine content representing ⅕ of the chlorine dioxide was .056 p. p. m. The total available chlorine present as chlorine dioxide was therefore .280 p. p. m.

Free chlorine, chloramine, chlorine dioxide and chlorite were determined in a fresh 250 ml. sample of the water by adding 5 ml. of the potassium iodide solution previously used and 2 ml. of 3 N sulfuric acid in that order. After the solution had stood for fifteen minutes, 15 ml. of pH 7 borate buffer was added and the solution titrated amperometrically with the standard arsenite solution. The total available chlorine content found was .412 p. p. m. indicating the absence of chlorite.

Example II

Another sample of water, drawn from the tap on a different day was found free of free chlorine and chlorite. The sample contained .077 p. p. m. of available chlorine as chloramine and .280 p. p. m. of available chlorine as chlorine dioxide.

Example III

A bleach solution used in the hypochlorite activated chlorite bleaching of a cotton textile contained, by conventional analytical methods, 4.0 grams per liter of available chlorine as sodium chlorite and 1.4 grams per liter as sodium hypochlorite. One ml. of this solution was diluted to one liter and analyzed by the procedure of Example I. The diluted solution was found to contain 1.34 parts per million of available chlorine as free chlorine and 4.03 parts per million as chlorite.

I claim:

Method of obtaining measurements useful in analyzing an aqueous solution for its content of chlorine in the form of elemental chlorine, hypochlorous acid, hypochlorite, chloramine, chlorine dioxide and water-soluble chlorites which comprises bringing a measured sample of the solution to a pH of at least 11, thereafter buffering the sample to a pH of about 7 and titrating against a standard arsenite solution the total chlorine present in the original solution in the form of elemental chlorine, hypochlorite and hypochlorous acid; bringing a second measured sample of the solution to a pH of at least 11, thereafter buffering the second sample to a pH of about 7, adding soluble inorganic iodide and titrating against a standard arsenite solution the total chlorine present in the original solution in the form of elemental chlorine, hypochlorite, hypochlorous acid and chloramine; bringing a third measured sample of the solution directly to a pH of about 7, adding soluble inorganic iodide and titrating against a standard arsenite solution the total chlorine present in the original solution in the form of elemental chlorine, hypochlorite, hypochlorous acid, chloramine and chlorine dioxide; and bringing a fourth measured sample of the solution to a pH of about 2, adding soluble inorganic iodide, buffering the sample to a pH of about 7 and titrating against a standard arsenite solution the total chlorine present in the original solution in the form of elemental chlorine, hypochlorite, hypochlorous acid, chloramine, chlorine dioxide and water-soluble chlorites.

JOHN F. HALLER.

REFERENCES CITED

The following references are of record in the file of this patent:

Mellor, "A Comprehensive Treatise on Inorganic and Theoretical Chemistry," Longmans, Green & Co., London, vol. II (1928), page 289.

Marks et al., J. A. W. W. A., vol. 34 (1942), pp. 1227–1240.